United States Patent [19]
Chen et al.

[11] Patent Number: 5,398,249
[45] Date of Patent: Mar. 14, 1995

[54] SYSTEM FOR PROVIDING SIMULTANEOUS MULTIPLE CIRCUIT-SWITCHED TYPE COMMUNICATIONS ON AN ISDN BASIC RATE INTERFACE

[75] Inventors: Chi-Chang Chen, Taichung; Bor-Shen Wu, Taipei; Jen-Yung Lin, Tainan; Min-Chang Lin, Taipei, all of Taiwan, Prov. of China

[73] Assignee: Industrial Technology Research Institute, Hsinchu, Taiwan, Prov. of China

[21] Appl. No.: 882,784

[22] Filed: May 14, 1992

[51] Int. Cl.⁶ ............................................. H04J 3/06
[52] U.S. Cl. ............................ 370/105.1; 370/110.1
[58] Field of Search ............... 370/60.1, 68, 84, 80, 370/85.7, 85.8, 94.2, 100.1, 105, 105.1, 105.5, 110.1; 371/47.1

[56] References Cited

U.S. PATENT DOCUMENTS

| | | | |
|---|---|---|---|
| 4,729,123 | 3/1988 | Wheen | 370/105.1 |
| 4,771,418 | 9/1988 | Narashimhan et al. | 370/110.1 |
| 4,797,904 | 1/1989 | Dekker et al. | 375/60 |
| 4,799,217 | 1/1989 | Fang | 370/100.1 |
| 4,935,923 | 6/1990 | Shimizu et al. | 370/60 |
| 4,953,180 | 8/1990 | Fieschi et al. | 370/84 |
| 4,970,723 | 11/1990 | Lin | 370/110.1 |
| 5,117,425 | 5/1992 | Ogata | 370/110.1 |

OTHER PUBLICATIONS

William Stallings, "ISDN An Introduction", ch. 8–5 (1989).

Primary Examiner—Benedict V. Safourek
Attorney, Agent, or Firm—Meltzer, Lippe, Goldstein et al.

[57] ABSTRACT

A system is disclosed which permits simultaneous multiple switched type communications on a basic access integrated services digital network (ISDN) without changing the standard frame format for transmission on the S/T interface. Simultaneous communication by up to 2N terminal equipments is achieved by defining a multiframe of N subframes, and separately allocating each of the 2N time slots of the B-channels within the N subframes to up to 2N terminal equipments for simultaneous communication over a single S interface bus.

19 Claims, 4 Drawing Sheets

LOGIC REPRESENTATION OF ONE MULTIFRAME

FIG. 4

FRAME STRUCTURE OF LAPD IN D-CHANNEL

FLAG = 0 1 1 1 1 1 1 0
CONTROL FIELD = 1 OR 2 OCTETS
FCS = FRAME CHECK SEQUENCE FIELD
ZERO BIT INSERTION AND DELETION
MINIMUM LENGTH OF LAPD FRAME = 7

SYSTEM FOR PROVIDING SIMULTANEOUS MULTIPLE CIRCUIT-SWITCHED TYPE COMMUNICATIONS ON AN ISDN BASIC RATE INTERFACE

FIELD OF THE INVENTION

This invention relates to an integrated services digital network (ISDN) basic subscriber access system and, more particularly, to the improvement of a communication system for increasing the number of circuit-switched type communication channels simultaneously operating on an ISDN basic rate S/T interface.

BACKGROUND OF THE INVENTION

ISDN is a general purpose digital network capable of supporting access to a wide range of interconnected services, such as voice, data, facsimile and video. ISDN achieves the support of a large variety of services by providing a standard digital network-user interface. A standardized interface, including different configurations, was disclosed in the I.400 series of recommendations by the CCITT in 1984.

Currently, there are two recommended standard ISDN interfaces for user access. They include a basic rate interface and a primary rate interface. A basic rate S/T interface supports transmission at a rate of 192 kbps. As recommended by the CCITT, a single ISDN basic rate S/T interface can provide a variety of voice and data services and accommodate up to eight terminal equipments.

Figure 1:
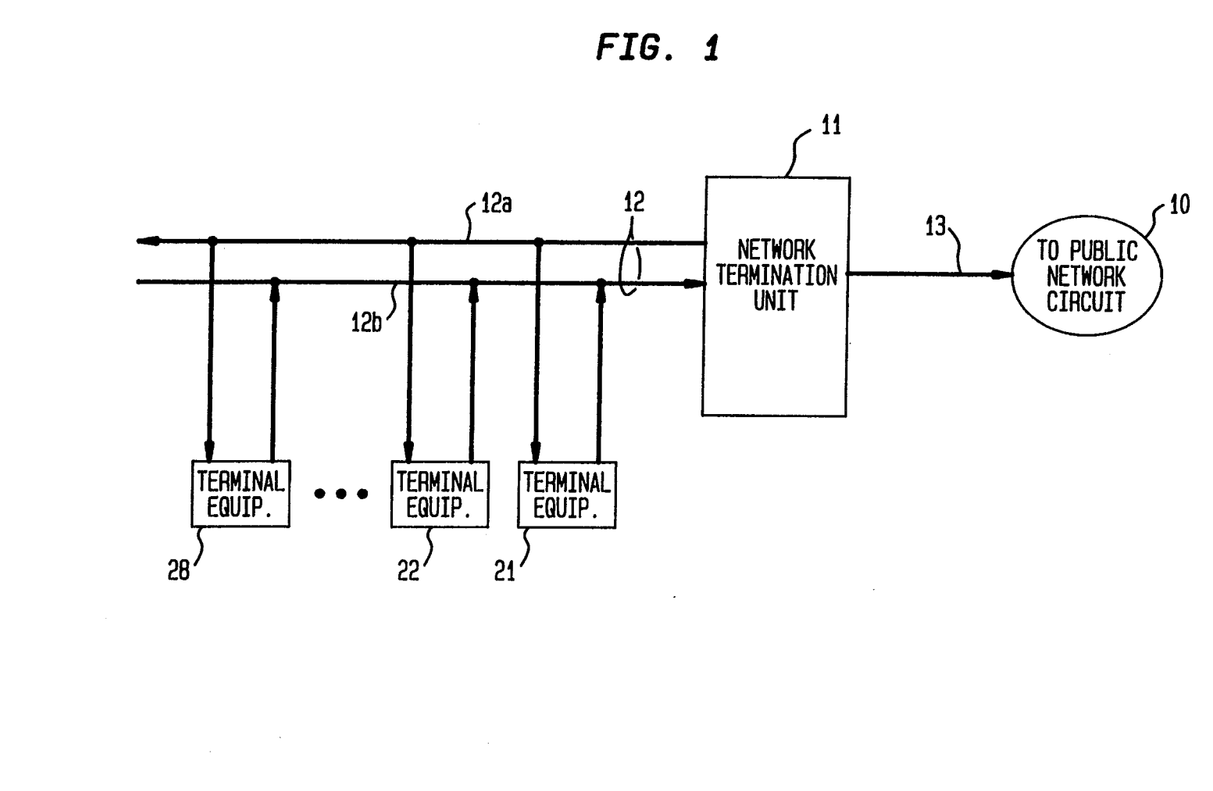
FIG. 1 is a block diagram of an ISDN user-network incorporating a basic rate interface as defined in the I.400 series of CCITT recommendations.

As illustrated in FIG. 1, a standard user-network interface comprises a public network circuit 10 (e.g., a central office switch or a PABX) and a network termination unit (NT) 11 which terminates a trunk line (digital subscriber bus) 13 from the public network circuit 10. A plurality of terminal equipments (TEs) 21, 22, ..., 28 are connected through a passive S interface bus (or S-bus) 12 in a point to multipoint configuration which supports two-way communication between the NT 11 and the individual TEs 21, ..., 28. The signal transmission direction from the NT 11 towards the TEs 21, 22, ..., 28 is denoted by 12a and the signal transmission direction from the TEs 21, 22, ..., 28 towards the NT 11 is denoted by 12b.

An ISDN, basic rate interface provides two full-duplex 64 kbps channels for communication, designated B1 and B2, and one full-duplex 16 kbps channel for signalling, designated D. The B-channels are the fundamental user access channels and are used to transmit circuit-switched type communication information data, digital, voice, or a mix thereof. The D-channel carries signalling information that controls circuit-switched calls on the associated B-channels. Such circuit-switched signalling is described in William Stallings, *ISDN An Introduction* ch. 8-5 (1989). In addition, the D-channel may be used for packet-switching or low-speed data transmission when the channel is not used for signalling.

Figure 2:
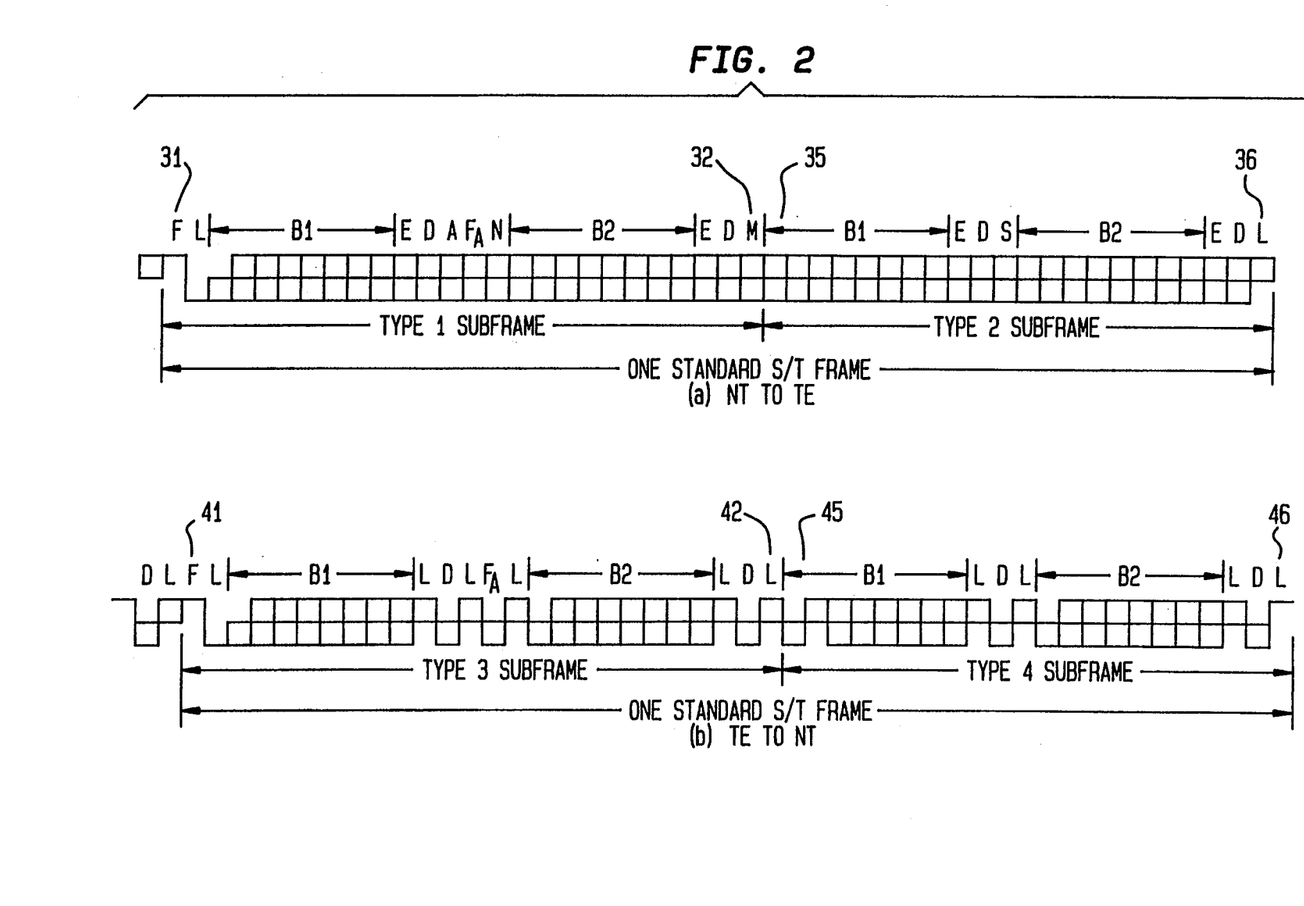
FIG. 2 shows the standard frame structures for signal transmission on a standard ISDN S/T interface defined in the CCITT I.430 recommendations and also illustrate an example of four types of subframes defined in accordance with the present invention.

The aforementioned channels and other signals transmitted in each direction 12a, 12b are combined into digital bit stream signals according to the standard ISDN S/T interface frame formats defined in the CCITT recommendations. FIG. 2 illustrate the standard frame formats for signal transmission on the S/T interface bus 12a and 12b respectively. The frames for the two directions both last 250 μs and are transmitted at a frame rate of 4kHz. FIG. 2 depicts the frame format for frames which are illustratively sequentially broadcast from the NT 11 to the TE's 21, ..., 28 in the direction 12a. Likewise, FIG. 2 also depicts frames broadcast from TE's 21, ..., 28 to the NT 11 in the direction 12b. Illustratively, frames transmitted by the TEs 21, ..., 28 in the direction 12b lag the frames transmitted by the NT 11 in the direction 12a by two bits.

AMI (alternative mark inversion) codes are used to transmit binary information on the S/T interface bus wherein a binary one is represented by no pulse and a binary zero is represented by a positive or negative pulse. Possible electric levels of each bit in the frames are shown in FIG. 2. In order to maintain a DC balancing scheme on the S/T interface, the number of negative pulses of each frame must equal the number of positive pulses.

Although the two frame formats transmitted in the two opposite directions 12a and 12b on the S/T interface are not symmetrical, both contain forty-eight bits including four D-channel bits (D) and four alternating octets of B1 and B2-channel bits, denoted as B1 and B2 respectively. Other control bits are included for framing (F), DC balancing (L), etc.

In order to maintain the DC balancing scheme according to the CCITT standard frame format, TE's may not share an octet of B-channel bits. When one TE occupies a whole octet of B-channel bits during communication, the other TEs connected with the same S/T interface bus must keep this B-channel idle, i.e., the other TEs transmit an octet of bits with the binary logic value 1, each bit having a zero amplitude, on this B-channel. As a result, a TE must occupy at least one entire B-channel, having a bandwidth of 64kHz, for voice or circuit-switched type communication whether or not the entire bandwidth of the B-channel is needed.

Since there are only two circuit-switched communication channels (B1 and B2) available on the basic access S/T interface, a single ISDN S/T interface permits, at most, only two TEs to receive or transmit information simultaneously. A problem arises in such a communication system having up to eight TEs connected to a single basic rate S/T interface, when two TEs are operated simultaneously and a third TE desires to commence immediate operation or is being called. There are no vacant B-channels available for the third TE. Further, each TE is allocated channels in 64 kHz bandwidth increments.

U.S. Pat. No. 4,935,923 (Shimizu), issued on Jun. 19, 1990 discloses an adapter for connecting a plurality of terminal equipments to a network termination unit in an ISDN system. The Shimizu adapter, however, does not allow more than two terminal equipments to simultaneously transmit on the S interface bus. U.S. Pat. No. 4,970,723 (Lin), issued on Nov. 13, 1990 discloses an ISDN basic rate interface system for expanding the number of voice terminals which may be simultaneously operated through the interface to four. The Lin system increases the number of terminals by converting eight-bit voice data to four-bit in order to permit two TEs to share each B-channel.

Specifically, in each subframe in the Lin reference, the B1 channel octet is divided into two four-bit nibbles to form a B11 channel and a B12 channel. The B2 channel octet is divided into two four-bit nibbles to form a B21 channel and a B22 channel. Thus, instead of two B channels each with a slot size of eight bits in a subframe, there are four channels each with a slot size of four bits.

In this manner, a total of up to four TE's share the two B channels.

It is therefore an object of the present invention to provide a single ISDN basic rate S/T interface supporting more than two circuit-switched communication channels on a single S interface bus.

It is another object of this present invention to permit simultaneous multiple communications among a plurality of TEs and a public network circuit using a single basic rate S/T interface without modifying basic standard frame structures on the S interface bus.

It is also an object of this present invention to provide an ISDN, basic access user-network interface which supports multiple circuit-switched type communication channels with a narrower bandwidth unit for the TEs to utilize.

SUMMARY OF THE INVENTION

This present invention accomplishes the foregoing objectives by establishing a multiframe structure which comprises a predetermined integral number (N) of subframes, where two contiguous subframes may comprise a standard S/T interface frame as per the standard frame format defined in the CCITT I.400 series of recommendations. Each subframe includes one octet of B1-bits, one octet of B2-bits, two D-bits and other information bits. Each B-channel octet time slot can be separately allocated for lower bandwidth circuit-switched communication channels defined as subchannels. Thus, the B1 and B2-channels, each of 64 kbps bandwidth, are divided into N sub B1-channels and N sub B2-channels, respectively, each of 64/N kbps bandwidth. N subframes define a multiframe. The NT and each individual TE connected via the S/T interface bus are equipped with multiframe boundary pulse generators for identifying the boundary of a multiframe. Multiframe synchronization between NT and TEs is established by a control signal transmitted on the D-channel. Illustratively, the signal, which violates the standard frame format used by conventional TEs and NTs, is ignored by network elements (i.e., TEs or NTs) which monitor the D-channel unless they are adapted according to the present invention.

BRIEF DESCRIPTION OF THE DRAWINGS

Further objects, features and advantages of the present invention can be more fully understood by means of the following description and accompanying drawings wherein.

DETAILED DESCRIPTION OF THE INVENTION

The description will now be given of a subframe structure according to the present invention. Referring to FIG. 2 again, a standard S/T interface frame structure includes four alternate octets of B1 and B2-channel bits. The S interface bus requires that one whole octet of B-channel bits be occupied by a single TE. This invention divides each of the standard whole frames into two parts, each referred to as subframes. Each subframe includes one octet of B1 bits, one octet of B2 bits and two D bits.

As shown in FIG. 2, the standard frame structure sent from the NT to the TEs is divided into two subframes denoted as a Type-1 subframe and a Type-2 subframe, respectively. The Type-1 and Type-2 subframes may be of different length, e.g., each may have a different number of bits. However, each subframe must contain equal numbers of B1, B2 and D-channel bits. Referring to the example shown in FIG. 2, the Type-1 subframe may comprise the twenty-six bits from the framing bit F 31 to the bit M 32 and, the Type-2 subframe may comprise the twenty-two bits from the bit subsequent to the bit M 32 (the first bit 35 of the second octet of B1-channel bits in a standard S/T frame) to the DC balancing bit L 36.

Likewise, the standard frame structure sent from the TEs to the NT is divided into two subframes denoted as Type-3 and Type-4, respectively. The Type-3 subframe illustratively comprises the twenty-six bits from the framing bit F 41 to the DC-balancing bit L 42. The Type-4 subframe illustratively comprises the twenty-two bits from the bit following the L bit 42 (the first bit 45 of the second octet of B1-channel bits) through the last bit of the frame L 46.

Alternatively, the Type-2 subframe may start at the bit M 32 and the Type-4 subframe may start at the bit 42. In either case, the number of B1, B2 and D-channel bits in the Type-2 and Type-4 subframes, respectively, remain equal to the number of B1, B2 and D channel bits of the Type-1 and Type-3 subframes. Other variations in subframe definitions are permitted provided that each type of subframe contains one octet of B1-channel bits, one octet of B2-channel bits and two D bits.

Figure 3:
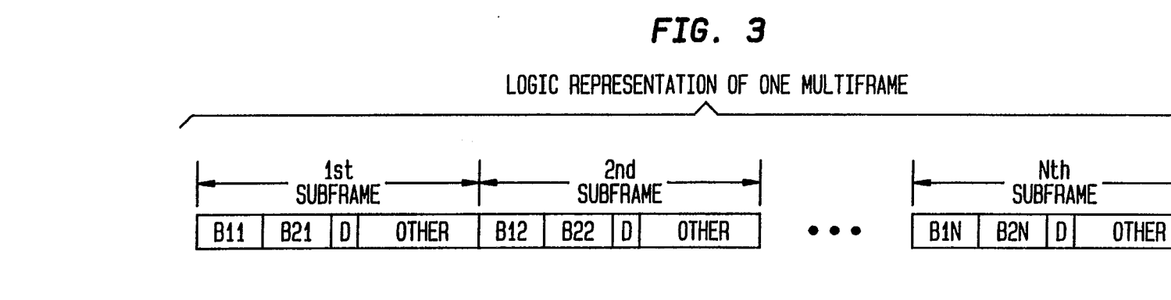
FIG. 3 is a diagram representative of a multiframe structure comprising N subframes.

FIG. 3 is a diagram representative of a multiframe structure comprising N subframes where N is a non-negative integer. Each subframe comprises four blocks denoted as B1i, B2i, D and other wherein i is an integer index between 1 and N. Block B1i and block B2i each represents an octet of B1-channel bits and an octet of B2-channel bits, respectively, block D contains two D-channel bits, and the other bits are simply represented by the block "Other". The bit sequence in each subframe (not shown in FIG. 3) conforms to the definition in the foregoing description of FIG. 2.

The multiframe structure of transmissions in the direction 12a from the NT 11 to the TEs 21, . . . , 28 comprises a predetermined integral number N of alternating Type-1 and Type-2 subframes. In accordance with the present invention, the first subframe and the last subframe of the multiframe can selectively be either of Type-1 or of Type-2. Likewise, the multiframe structure from the TEs to the NT comprises the same predetermined number N of alternate Type-3 and Type-4 subframes. Similarly, the first subframe and the last subframe of the multiframe structure may also selectively be either of Type-3 or of Type-4. As illustrated in FIG. 3, each of the multiframe structures thus comprises N octets of B1-channel bits, each octet denoted as B11, B12, ..., B1N, respectively, and N octets of B2-channel bits, each octet denoted as B21, B22, ..., B2N, respectively. The integer number N can be either an odd or an even number. According to the present invention, when N is an odd number, the first subframe of two consecutive multiframes transmitted along the same direction of the S/T interface are of different types.

In view of the aforementioned multiframe structures, the B1-channel may be divided into N lower rate circuit-switched type communication channels, referred to as subchannels (or, more particularly, sub B1-channels) denoted as B11, B12, ..., BiN. The B2-channel may also be divided into N sub B2-channels denoted as B21, B22, ..., B2N. Since the bandwidth of each B-channel on the S interface bus is 64 kHz, each sub B-channel, B1 or B2i, occupies the bandwidth of 64/N kbps.

According to the invention, the standard S/T frame format transmitted on the S/T interface does not change. Instead, information subchannels of lower bandwidth are allocated to the TEs. Since each subchannel occurs once per multiframe, it is important for the NT and the TEs to identify the boundaries of multiframes transmitted and received at both the NT and the TEs. The multiframe boundary can be defined as the start bit or the end bit of a multiframe.

As recommended by the CCITT I.400 recommendations, the standard S/T interface frame structures allow the NT and the TEs to identify the frame boundaries by detecting the position of the framing bit F of each frame. In response to the framing bit F, the NT and the TEs generate signals indicating the boundaries of the frames. Since the frames are transmitted periodically at a rate of 4 kHz, the signals for identifying the frame boundaries are clock pulse signals of 4 kHz. One subframe boundary is defined by the framing bit F. The other boundary is located near the middle of two contiguous frames. As such, the signals for identifying the subframe boundaries are clock pulse signals of 8 kHz. The devices in the NT and the TEs for generating subframe boundary signals are well-known components. For example, a SIEMENS PEB2081 (ISDN Subscriber Access Controller) provides for the extraction of the 8 kHz subframe boundary pulses from signals transmitted on the S/T interface.

This invention identifies multiframe boundaries at the NT and each TE by generating multiframe boundary clock pulse signals every N sequential subframe boundary pulses. The position of a multiframe boundary is determined by the NT. The NT may select any subframe as the start or end of the multiframe boundary. The NT also provides for multiframe synchronization between the NT and the TEs. When performing the synchronization procedure, the present invention utilizes the D-channel in order to transmit signals for multiframe synchronization between the NT and the TEs.

First, the NT determines the positions of multiframe boundaries. Should the NT determine that the whole communication system requires a synchronization procedure, the NT searches for vacant D time slots to broadcast a specified bit stream pattern on the D channel. The timing of this broadcast on the D channel provides a reference point for maintaining the relative position of multiframe boundary pulses in the NT and the TEs. Once the TEs detect the special bit stream pattern broadcast from the NT, they may adjust the timing of their respective clock mechanisms in relation to the clock mechanism of the NT. Then, because the relative positions of the boundary of a multiframe along the NT to TE direction 12a is fixed, the relative boundaries along the TE to NT direction 12b may be fixed in relation thereto.

According to the present invention, the synchronization procedure between the NT and the TEs need not be repeated continuously. Once synchronization is achieved, the multiframes can be repeatedly transmitted along both directions 12a and 12b.

Figure 4:
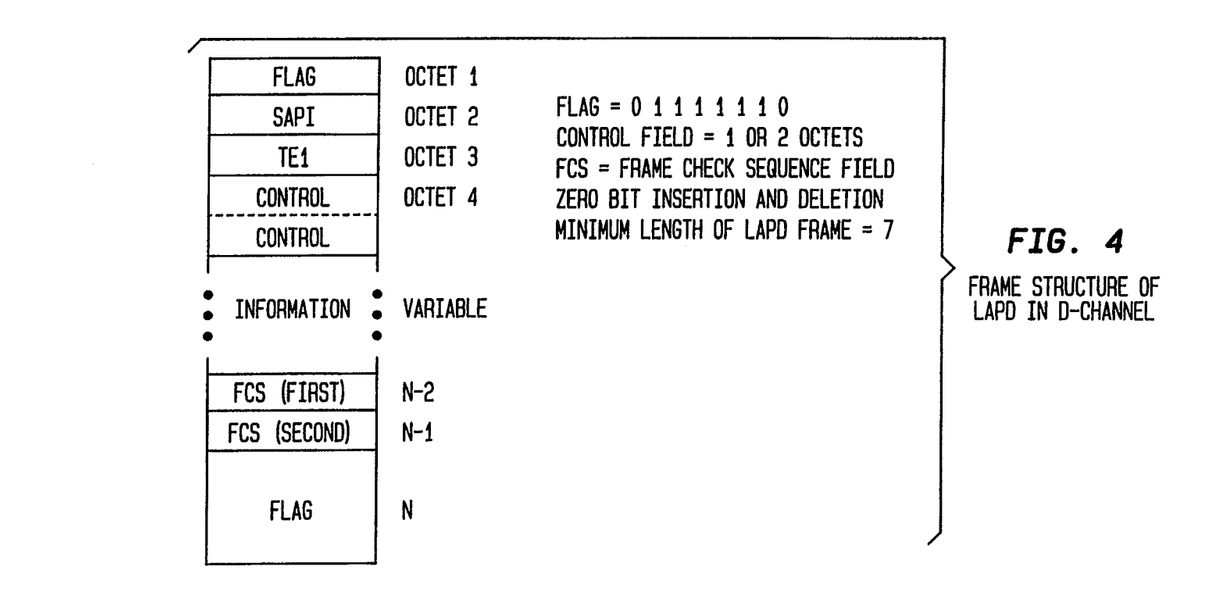
FIG. 4 shows the standard frame format of the LAPD.

The synchronization instruction communicated on the D-channel must be selected so as not to disrupt conventional communication equipment which may be connected to the S/T interface. Conventional D-channel communication is achieved via a plurality of logical connections or links made to the D-channel using the Link Access Procedure on D-channel (LAPD). Various control instructions may be transmitted through the links. FIG. 4 shows the standard frame format of the LAPD which conforms with the High-level Data Link Control procedure (HDLC). In accordance with the HDLC, no more than six sequential logical 1 bits are permitted in a valid instruction.

A standard LAPD frame includes a start flag field (FLAG) of one octet length, a service access point identifier field (SAPI) of one octet length, a TEI field of one octet length, a control field of one or two octet(s) length, a frame check sequence field (FCS) of two octets length, and an ending flag of one octet length. The minimum total length of a LAPD frame is seven octets. Such a short LAPD frame occurs when the information field is empty. The bit patterns of the start flag and the ending flag are both 01111110. The FCS field stores a CRC-CCITT error-detecting code with the divider polynomial $(X^{16}+X^{12}+X^5+1)$.

When the system according to the present invention performs synchronization procedures, the NT broadcasts a specified synchronization bit stream pattern on the D-channel which violates the LAPD format. In other words, the synchronization bit stream pattern used to initiate the synchronization procedure cannot be recognized by standard ISDN TEs. However, the TEs according to this invention can receive and recognize such a pattern. Upon detecting such a pattern, the TEs generate a signal for adjusting the timing of the multiframe boundary identification mechanism (i.e., the multiframe clock at each TE) in accordance with the multiframe clock of the NT.

The specified synchronization bit pattern may be any bit pattern which violates the LAPD standard frame format. Illustratively, one of the following synchronization patterns may be used:

(1) A synchronization pattern containing only instructions which conform to the HDLC format, i.e., the start and ending flag patterns are both 01111110, but having fewer than seven octets.

(2) A synchronization pattern which conforms to the HDLC format, the FCS field of which stores an error-detecting code with a polynomial other than $X^{16}+X^{12}+X^5+1$.

(3) A synchronization pattern which violates the HDLC format by having more than six logical 1 bits in sequence.

Figures 5, 6:
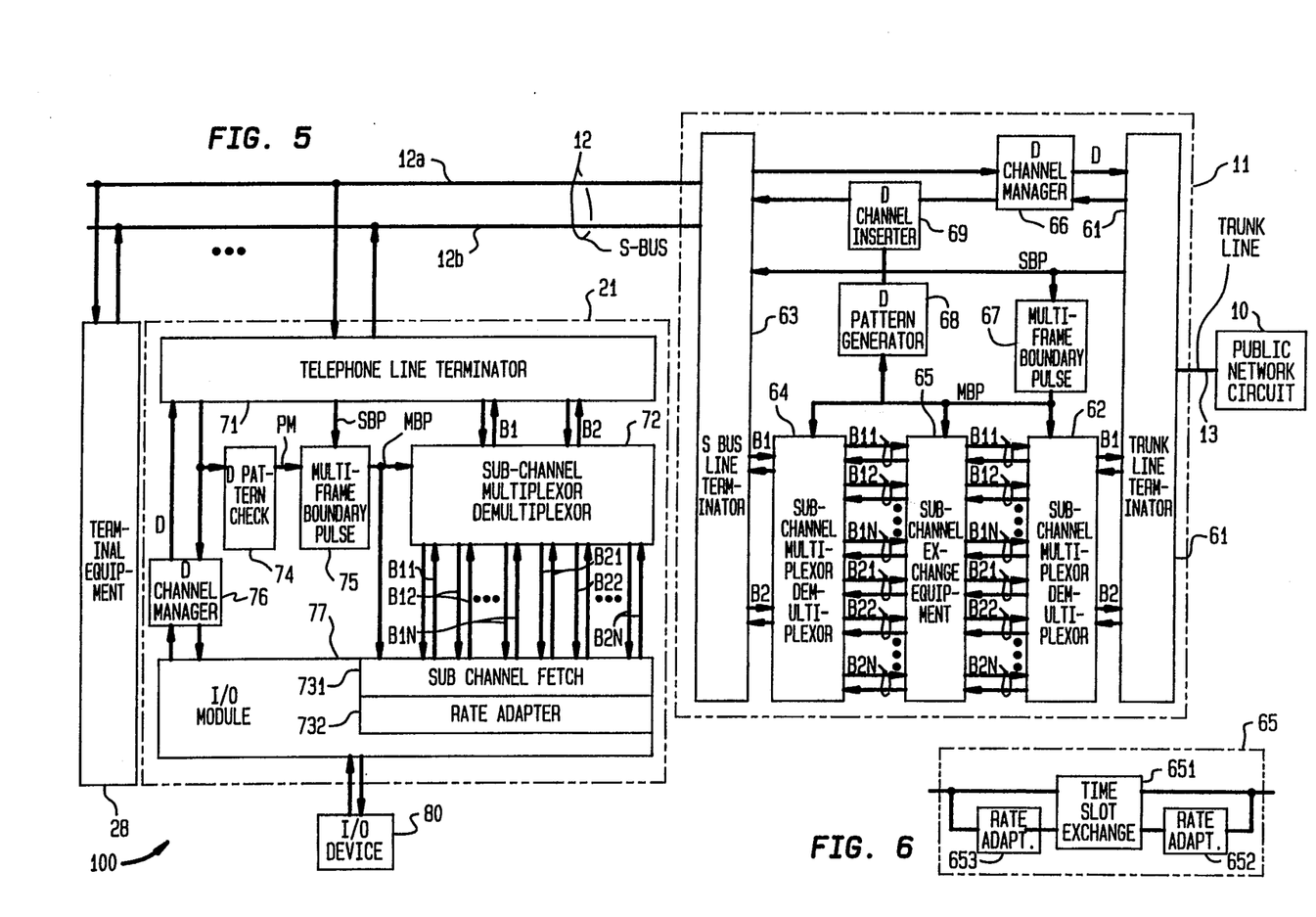
FIG. 5 is a block diagram of an ISDN basic access system according to a preferred embodiment of the present invention.
FIG. 6 is a block diagram of a subchannel exchange management circuit of the ISDN basic access system of FIG. 5.

Referring now to FIG. 5, a block diagram of an ISDN basic access system 100 according to a preferred embodiment of the present invention is shown. The ISDN basic access system 100 includes a basic access S interface bus (or S-bus) 12 connecting a plurality of terminal equipments (TEs) 21, . . . , 28 to a network termination unit (NT) 11 which terminates a trunk line (digital subscriber line) 13 from a public network circuit 10.

In the NT block 11 of FIG. 5, a well-known trunk line termination circuit (TLT) 61, e.g., SIEMENS PEB2081, demultiplexes a signal transmitted from the public network circuit 10 into discrete channels B1, B2 and D and multiplexes each channel B1, B2 and D into a signal for transmission to the public network circuit 10. A well-known S-bus line termination circuit (SLT) 63, e.g., SIEMENS PEB2081, which terminates the S-bus 12, demultiplexes a signal transmitted from the TEs 21, . . . ,28 on the S-bus line 12 into the channels B1, B2 and D, and multiplexes the channels B1, B2 and D into a signal for transmission to the TEs 21, . . . ,28 on the S-bus line 12. The TLT also extracts subframe boundary clock pulses (SBPs) from the signals on the trunk link 13 and inputs these SBPs to the SLT 63. SBPs may occur periodically near the start position of each subframe. Since the subframes are transmitted at a rate of 8 kHz, the frequency of SBPs is 8 kHz.

The subframe boundary pulses are also inputted to a multiframe boundary pulse generator (MBPG) 67 to generate a multiframe boundary pulse (MBP) every N subframe boundary pulses, where N is a non-negative integer. The MBPG 67 may illustratively be implemented using a divide-by-N counter. The multiframe boundary pulses MBPs are then inputted to a subchannel multiplexer-demultiplexer (SMDX) 62 connected to the TLT 61 and a subchannel multiplexer-demultiplexer (SMDX) 64 connected to the SLT 63. Thus, with the MBPs, the SMDX 62 and the SMDX 64 can identify the first subframe in a multiframe and can demultiplex the B1-channel into N sub B1-channels which are denoted as B11, B12, . . . , B1N. Additionally, the B2-channel is demultiplexed into sub B2-channels which are denoted as B21, B22, . . . , B2N. Each sub B-channel (B1i or B2i) occupies the bandwidth of 64/N kbps.

A subchannel exchange and management circuit (SCEM) 65 also receives MBPs sent from the MBPG 67. Referring to FIG. 6, the SCEM 65 includes a time slot exchanger 651 for selectively exchanging sub B-channels from the S-bus 12 and the trunk line 13. In this manner, local inter-TE 21, . . . ,28 communication is established and some TEs may receive information from, or transmit information to, the trunk line 13. Connections, i.e., the exchange of information between subchannels of local and/or external network elements which receive or transmit information are established according to calls by external elements or requests by local TEs 21, . . . ,28. Since the TEs 21, . . . , 28 may be of different kinds, i.e., they may require different bandwidths for communication, rate adapters (RA) 652 and 653 are also included in SCEM 65. The RAs 652 and 653 perform rate conversion and determine the number of subchannels assigned to each transmitting or receiving TE 21, . . . ,28. The available bandwidth for each TE 21, . . . ,28 may be m.64/N kbps wherein m is any non-negative integer less than or equal to 2N. In the case where each operating TE 21, . . . ,28 needs only one subchannel, a total of 2N TEs may be simultaneously operating.

A TE line termination unit (TELT) 71 in each of the terminal equipments 21, 22, . . . ,28 terminates the S-bus 12. The TELT 71 demultiplexes a signal transmitted on the S-bus 12 from the NT 11 into the channels B1, B2 and D and multiplexes channels B1, B2 and D into a multiplexed signal on the S-bus 12 for transmission to the NT 11. The TELT 71 functions similarly to TLT 61 and SLT 63 in the NT 11 and illustratively may also be a SIEMENS PEB2081 circuit. Each TE 21, . . . ,28 also comprises a multiframe boundary pulse generator (MBPG) 75 which receives SBPs extracted by the TELT 71 and generates a multiframe boundary pulse (MBP) every N SBPs. This MBP is used for identifying the boundary of a multiframe structure at, e.g., the TE 21. The MBP is sent to the sub B-channel multiplexer-demultiplexer (SMDX) 72 which demultiplexes the B1 and B2-channels into 2N sub B-channels denoted as B11, B12, . . . , B1N, and B21, B22, . . . , B2N.

Each TE 21, . . . ,28 further includes an Input/Output Management circuit (IOM) 77 for controlling Input/Output Devices (I/O Devices) 77 connected to that particular TE 21, . . . ,28, such as a microphone, a speaker, a data port or other onhook/offhook devices. The IOM 77 comprises a subchannel fetch/assignment circuit (SFA) 731 which receives MBPs for sequencing the reception and transmission of information on allocated sub B-channels. The IOM 77 also comprises a rate adapter (RA) 732 for matching the transmission rate of the sub B-channels with that of the I/O Devices 80.

By virtue of the MBPG 67, which is connected to the SMDX 62, the SMDX 64 and the SCEM 65, multiframe synchronization is established on the NT 11 end of the S-bus 12 and trunk line 13. Similarly, multiframe synchronization is established at each TE end of the S-bus 12 by virtue of the interconnection of the MBPG 75, the SMDX 72 and the IOM 77. However, the MBPG 75 of each TE 21,. . . ,28 must be synchronized in relation to he MBPG 67 of the NT 11. The synchronization procedure between the NT 11 and TEs 21, . . . 28 is disclosed in greater detail below.

There is a D-channel management circuit (DM) 66 at the NT 11 side connected between the D-channel input and output (I/O) terminals of the TLT 61 and D-channel I/O terminals of the SLT 63. The DM 66 is provided for the transfer of D channel information including call transactions to make a connection link, etc. Similarly, there is a DM 76 at each TE 21, . . . ,28 connected between the D-channel I/O terminals of the TELT 71 and the I/O terminals of the IOM 77 for transfer of D-channel information.

The multiframe synchronization procedures between the NT 11 and the TEs 21,. . . ,28 are performed using the D-channel. Referring again to FIG. 5, for establishing multiframe synchronization between the NT 11 and the TEs 21,. . . , 28, the NT 11 further comprises a D-pattern insertion circuit (DPI) 69 and a D-pattern generator (DPG) 68. The DPG 68 receives the MBP generated by the MBPG 67. When the NT 11 starts a multiframe synchronization procedure, the DPG 68 is triggered to generate a specified bit stream pattern, defined as a multiframe synchronization pattern, and which violates the LAPD frame format. Using the MBP, the DPG 68 selectively broadcasts the multiframe synchronization pattern at a particular time depending on the MBP. The multiframe synchronization pattern is inputted to the DPI 69 which can be implemented using an AND gate. The DPI 69 searches for vacant D time slots in which the multiframe synchronization pattern may be inserted. Then, through the SLT 63 and S-bus 12, the multiframe synchronization pattern is broadcast to all of the TEs 21, . . . ,28.

Each TE 21, . . . ,28 comprises a D-pattern check circuit (DPC) 74 which monitors the incoming D-channel demultiplexed by the TELT 71. At the TE 21 end of the S-bus 12, the TELT 71 demultiplexes the multiframe synchronization pattern received by the DPC 74 (the DM 76 ignores this pattern because it violates the LAPD format). The DPC 74 compares the received pattern with a pattern stored therein. In response to this comparison, the DPC 74 generates a pattern matching signal PM to adjust the timing of the clock mechanisms in the MBPG 75. Thus, the synchronization between the NT 11 and the TEs 21, . . . ,28 is established. The multiframe synchronization procedure need not be executed repeatedly. Once the communication system is in a stable state, the DPG 68 is disabled to end the multiframe synchronization procedure.

In summary, a multiframe structure for communication in an ISDN basic access system has been disclosed. In a preferred embodiment, all of the sub B-channel time slots of each B-channel of every N consecutive subframes (or every multiframe), are separately allocated to the terminal equipments as needed. Additionally, means have been disclosed for detecting each multiframe at both the terminal equipments and the network termination unit so that transmission and reception of information occurs only on allocated subchannels. Additionally, means for mutual synchronization of the detection of multiframes at each end of the S-bus have been disclosed.

Finally, the aforementioned discussion is intended merely to illustrate the invention. Numerous other embodiments may be devised by those skilled in the art without departing from the scope of the following claims.

We claim:

1. A method of communicating on an integrated services digital network (ISDN) basic access system between terminal equipments, a network termination unit connected to the terminal equipments, and a digital subscriber line, said system supporting synchronous bi-directional digital transmission of bits organized into sequential frames, each frame comprising two sequential subframes, each subframe comprising two B-channel octets of bits and a plurality of D-channel bits, said method comprising:

(a) generating in a first multiframe clock generating means at a network termination unit a first multiframe clock signal every N subframes, for identifying at said network termination unit multiframes comprising N sequential subframes, where N is an integer equal to or greater than two;

(b) generating in a second multiframe clock generating means at a terminal equipment a second multiframe clock signal every N subframes, synchronized in relation to said first multiframe clock, for identifying, at a terminal equipment, multiframes comprising N sequential subframes; and (c) in response to said first clock signal, at said network termination unit and using slot interchange means exchanging particular B-channel octets of said N subframes comprised in each multiframe for transmission to and from up to 2N terminal equipments, said B-channel octets of said N subframes comprised in each multiframe being individually allocatable to particular ones of said up to 2N terminal equipments.

2. The method of claim 1 wherein step (b) comprises:

(b1) in response to at least one impulse of said first multiframe clock signal, transmitting a synchronization signal, indicative of the timing of said at least one impulse, from a synchronization signal generating means to said second multiframe clock generating means on said D-channel; and (b2) in response to said synchronization signal transmitted to said second multiframe clock generating means, utilizing said second multiframe clock generating means for adjusting said second multiframe clock signal in relation to said first multiframe clock signal.

3. The method of claim 1 wherein step (c) comprises:

(c1) determining the number of said 2N B-channel octets of each multiframe to allocate for transmitting to and for receiving information from each of up to 2N terminal equipments; and (c2) selectively exchanging B-channel octets from said network termination unit and said digital subscriber line.

4. A method of communicating on an integrated services digital network (ISDN) comprising the steps of transmitting, in both directions between a plurality of terminal equipments and a network interface, a stream of data bits organized into multiframes, each multiframe comprising N subframes, where N is equal to or greater than two, each subframe comprising two B-channel octets, and separately allocating each B-channel octet contained in the multiframes to particular ones of said terminal equipments so that up to 2N units of terminal equipment can transmit and receive data in said data bit stream.

5. The method of claim 4 further comprising:

generating a first multiframe clock signal for identifying the boundaries of multiframes within said bit stream at a network interface; and generating a second multiframe clock signal for identifying the boundaries of multiframes within said bit stream at said terminal equipments.

6. The method of claim 5 further comprising:

generating a clock synchronization signal depending on said first multiframe clock signal and transmitting said clock synchronization signal within said bit stream from said network interface to said terminal equipments and adjusting said second multiframe clock signal depending on said clock synchronization signal.

7. The method of claim 4 further comprising the steps of exchanging particular ones of said 2N B-channel octets comprised in each multiframe for transmission of data in said particular ones of said 2N B channels octets to and from corresponding ones of up to 2N terminal equipments.

8. A network termination unit, connected to a digital subscriber line and, via an S-bus, to terminal equipments, for use in an integrated services digital network supporting transmission of digital signals organized into frames, each frame comprising two subframes, each subframe having two B-channel time slots and a signaling D-channel time slot, said network termination unit comprising:

first multiframe clock generating means for generating first multiframe clock pulses every N subframes, where N is an integer equal to or greater than two, for identifying multiframes comprising N sequential subframes, each multiframe having 2N B channel time slots; and slot management means, responsive to said first multiframe clock pulses, for determining the number of said 2N B-channel time slots needed by each of up to 2N terminal equipments in each multiframe and assigning particular ones of said 2N B-channel time slots to each of said up to 2N terminal equipments as needed.

9. The network termination unit of claim 8 further comprising:

time slot exchange means connected to said S-bus and said digital subscriber line and responsive to said slot management means, for selectively exchanging B-channel time slots from said S-bus and said digital subscriber line.

10. The network termination unit of claim 8 further comprising clock synchronization means, responsive to at least one impulse of said first multiframe clock pulses, for generating a clock synchronization signal indicative of the timing of said at least one impulse, and for transmitting to said terminal equipments said clock synchronization signal for synchronizing remote second multiframe clocks, located at said terminal equipments, in relation to said first multiframe clock pulses.

11. The network termination unit of claim 10, wherein said clock synchronization means transmits said clock synchronization signal in said signalling D-channel time slot.

12. The network termination unit of claim 11, wherein said clock synchronization means transmits a signal which violates a Link Access Procedure format on the D-channel.

13. The network termination unit of claim 12 wherein said clock synchronization signal comprises up to six octets of bits.

14. The network termination unit of claim 12 wherein said clock synchronization signal comprises an error detecting code determined with a polynomial other than $x^{16}+x^{12}+x^5+1$.

15. The network termination unit of claim 12 wherein said signal comprises octets with more than six logical 1 bits in sequence.

16. A terminal equipment, connected via a bi-directional S-bus to a network termination unit having a remote clock, for use in an integrated services digital network (ISDN) supporting transmission of a sequence of digital signals organized into frames, each frame comprising two subframes, each subframe comprising two B-channel time slots and a signaling D-channel time slot, said terminal equipment comprising:

multiframe clock generating means for generating multiframe clock pulses, synchronized in relation to said remote clock of said network termination unit, every N subframes, where N is an integer equal to or greater than two, for identifying multiframes comprising N subframes and containing 2N B-channel time slots; and means, responsive to said multiframe clock pulses, for receiving and transmitting information on particular ones of said 2N B-channel time slots in a multiframe by extracting information from only specific B-channel time slots assigned by slot management means to said terminal equipment for receiving information and by inserting information only onto specific B-channel time slots assigned by said slot management means to said terminal equipment for transmitting information.

17. The terminal equipment of claim 16 further comprising timing adjustment means, responsive to a clock synchronization signal of said network termination unit, for synchronizing said multiframe clock pulses in relation to said clock synchronization signal.

18. The terminal equipment of claim 16 wherein said slot management means is located at said network termination unit.

19. An integrated services digital network (ISDN) basic access system having a network termination unit connected to a plurality of terminal equipments via a bi-directional bus and supporting bi-directional transmission of a sequence of digital bits organized into sequential frames, each frame comprising two subframes, each subframe comprising two B-channel octets of bits and D-channel bits, said system comprising:

first multiframe clock generating means for generating first multiframe clock pulses every N subframes, where N is an integer equal to or greater than two;

second multiframe clock generating means for generating second multiframe clock pulses, synchronized in relation to said first multiframe clock pulses, every N subframes;

slot management means located at said network termination unit for determining the number of B-channel octets of each group of N subframes between first multiframe clock pulses needed by each of up to 2N terminal equipments and for assigning particular ones of said B-channel octets to said up to 2N terminal equipments; and means, located at each terminal equipment and responsive to said second multiframe clock pulses, for selectively transmitting and receiving information to and from said network termination unit on assigned B-channel time slots of each group of 2N subframes between second multiframe clock pulses.

* * * * *